United States Patent
Akiyama et al.

(10) Patent No.: US 6,990,136 B2
(45) Date of Patent: Jan. 24, 2006

(54) LASER BEAM TRANSMISSION APPARATUS

(75) Inventors: Yasuhiro Akiyama, Yokohama (JP);
Naotada Okada, Yokohama (JP);
Mitsuo Sasaki, Yokohama (JP);
Takashi Obara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 10/234,179

(22) Filed: Sep. 5, 2002

(65) Prior Publication Data
US 2003/0058542 A1  Mar. 27, 2003

(30) Foreign Application Priority Data
Sep. 5, 2001  (JP) .............................. 2001-268576

(51) Int. Cl.
*H01S 3/08* (2006.01)
*G02B 3/10* (2006.01)
*G02B 6/32* (2006.01)

(52) U.S. Cl. ...................... 372/101; 372/108; 359/721; 385/33

(58) Field of Classification Search ................ 372/101, 372/19, 108; 359/721, 720; 385/33, 39, 385/52
See application file for complete search history.

(56) References Cited

U.S. PATENT DOCUMENTS 4,842,360 A * 6/1989 Caro et al. ..................... 385/33
4,907,235 A * 3/1990 Kuizenga ...................... 372/21
6,037,579 A * 3/2000 Chan et al. ................. 250/216

FOREIGN PATENT DOCUMENTS

| JP | 7-307513 | 11/1995 |
| JP | 8-167754 | 6/1996 |
| JP | 2001-94177 | 4/2001 |

\* cited by examiner

*Primary Examiner*—Minsun Oh Harvey
*Assistant Examiner*—Armando Rodriguez
(74) *Attorney, Agent, or Firm*—Oblon, Spivak, McClelland, Maier & Neustadt, P.C.

(57) ABSTRACT

A laser beam transmission apparatus comprises a light-incidence optical system (22) converging and focusing a laser beam emitted from a solid-state laser apparatus (1), and an optical fiber (8) which transmits the laser beam that has been converged and focused by the light-incidence optical system. The light-incidence optical system (22) has at least first and second lenses (13, 14) disposed on the same optical path. A first distance (a) between an output end of the solid-state laser apparatus and the first lens or a second distance (b) between the second lens and a light-incidence end of the optical fiber is freely set according to a relational formula based on a focal distance ($f_1$, $f_2$) of each of the first and second lenses.

11 Claims, 4 Drawing Sheets

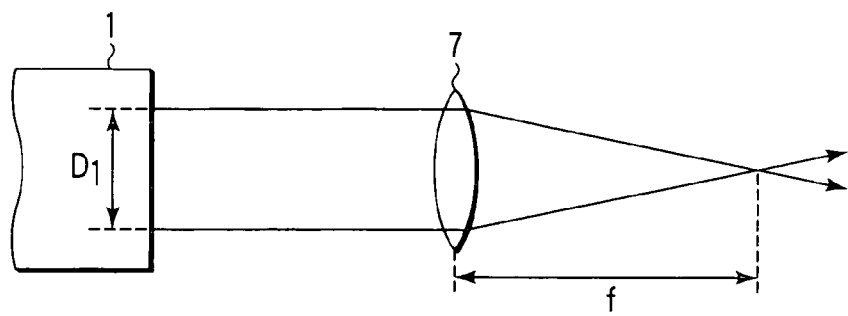
F I G. 8
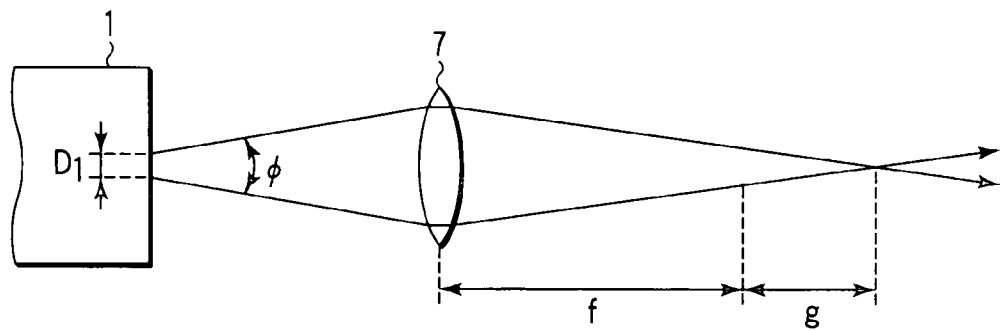
F I G. 9
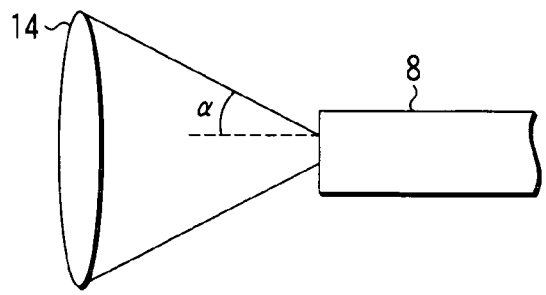
F I G. 10

LASER BEAM TRANSMISSION APPARATUS

CROSS-REFERENCE TO RELATED APPLICATIONS

This application is based upon and claims the benefit of priority from the prior Japanese Patent Application No. 2001-268576, filed Sep. 5, 2001, the entire contents of which are incorporated herein by reference.

BACKGROUND OF THE INVENTION

1. Field of the Invention

The present invention relates to a laser beam transmission apparatus which transmits a laser beam with good convergence properties.

2. Description of the Related Art

FIG. 6 is a view showing the structure of a laser processing apparatus. A solid-state laser apparatus 1 is of a rod-type. The solid-state laser apparatus 1 has a total-reflection mirror 3 at one end of a laser resonator 2, and a partial-reflection mirror 4 at the other end. The total-reflection mirror 3 and partial-reflection mirror 4 are disposed opposed to each other.

Two laser rods 5 and 6, for example, are provided between the total-reflection mirror 3 and partial-reflection mirror 4 in series on a laser optical axis.

The solid-state laser apparatus 1 has an excitation section (not shown) that excites the two laser rods 5 and 6.

With this structure, when the two laser rods 5 and 6 are excited, laser resonance takes place between the total-reflection mirror 3 and partial-reflection mirror 4. The laser resonance gradually increases the laser beam energy. When the laser beam energy has reached a predetermined value or more, a laser beam is emitted from the partial-reflection mirror 4.

A converging lens 7 is provided on an optical path of the laser beam emitted from the solid-state laser apparatus 1. The converging lens 7 converges the laser beam output from the solid-state laser apparatus 1 and makes it incident on a light-incidence end portion 9 of an optical fiber 8. The converging lens 7 makes the laser beam incident on the optical fiber 8.

It is common art to use the converging lens 7 for making the laser beam incident optical fiber 8. For instance, Jpn. Pat. Appln. KOKAI Publication No. 8-167754 and Jpn. Pat. Appln. KOKAI Publication No. 7-307513 disclose techniques wherein a laser beam is made incident on an optical fiber (8) using a converging lens group.

The optical fiber 9 is laid between the location of the solid-state laser apparatus 1 and a place for processing work. A light-emission end portion 11 is provided at the other end of the optical fiber 9.

The optical fiber 8 guides the laser beam, which has entered from the light-incidence end portion 9, and emits it from the light-emission end portion 11. The light-emission end portion 11 is provided with a head lens 12 that constitutes a processing head.

Thus, the laser beam emitted from the light-emission end portion 11 is converged through the head lens 12 and applied to a workpiece 10. The workpiece 10, for example, is welded or cut by the application of the laser beam.

For example, Jpn. Pat. Appln. KOKAI Publication No. 2001-94177 also discloses a technique for making a laser beam incident on an optical fiber (8). FIG. 7 shows the structure of a light-incidence optical system disclosed in this document.

A first lens 13 and a second lens 14 are provided in series on a laser beam optical axis between a solid-state laser apparatus 1 and a light-incidence end portion 9 of an optical fiber 8. The first lens 13 and second lens 14 constitute a telecentric optical system.

The focal distance of the first lens 13 is $f_1$, and that of the second lens 14 is $f_2$.

The distance between a light-emission plane F of solid-state laser apparatus 1 and the first lens 13 is set at $f_1$, and the distance between the first and second lenses 13 and 14 is set at $f_1+f_2$.

The distance between the second lens 14 and a light-incidence plane R of optical fiber 8 is set at $f_2$.

The beam emission diameter of the laser beam emitted from the light-emission plane F is $D_1$.

The beam incidence diameter of the laser beam incident on the light-incidence plane R is $D_2$.

According to the following equation, the light-incidence optical system focuses the laser beam with the beam emission diameter $D_1$ on the light-incidence plane R:

$$D_2 = (f_2/f_1) D_1 \qquad (1)$$

Accordingly, the light-incidence optical system reduces the beam emission diameter $D_1$ to the beam incidence diameter $D_2$, which is equal to a value obtained by multiplying $D_1$ by $(f_2/f_1)$.

However, in the techniques of Jpn. Pat. Appln. KOKAI Publication No. 8-167754 and Jpn. Pat. Appln. KOKAI Publication No. 7-307513, if the divergence angle of the laser beam emitted from the laser apparatus 1 varies, a minimum spot position of the converging lens 7 shifts in the laser optical axis direction.

When the laser processing apparatus, for example, welds the workpiece 10, it increases or decreases the laser output. In general, when the laser output of the rod-type solid-state laser apparatus 1 is increased or decreased, the emission beam diameter $D_1$ of the laser beam and the divergence angle of the beam will vary.

Specifically, FIG. 8 shows the emission beam diameter and the divergence angle of the beam when the laser output is decreased. FIG. 9 shows the emission beam diameter $D_1$ and the divergence angle $\phi$ of the beam when the laser output is decreased.

The divergence angle $\phi$ of the beam tends to increase in accordance with an increase in laser output. The emission beam diameter D1 tends to decrease in accordance with an increase in laser output.

When the laser output is small, the minimum spot position is present at a distance f, as shown in FIG. 8. However, if the laser output is increased, the minimum spot position shifts farther by a distance g from the converging lens 7, as shown in FIG. 9. As a result, the minimum spot position shifts to a point of distance f+g from the converging lens 7.

The optical fiber 8 comprises a core layer and a clad layer that are coaxially arranged. It is required that the laser beam be converged to have a beam incidence diameter D2 that is substantially equal to a core diameter and then enter the core layer.

However, if the minimum spot position shifts, the beam incidence diameter $D_2$ does not agree with the core diameter. To solve this problem, the core diameter has to be set at a sufficiently large value, considering in advance the beam incidence diameter $D_2$ at a time the laser output may be increased.

However, if the laser beam is transmitted through the optical fiber 8 with an increased diameter, the beam quality of the laser beam cannot be maintained, and the optimal beam quality cannot be achieved.

On the other hand, in the telecentric optical system shown in FIG. 7, the beam with the beam emission diameter $D_1$ is focused with a reduced diameter.

Thus, an optical fiber with a small core diameter can be used. Thereby, the telecentric optical system can maintain the beam quality of the laser beam and achieve a maximum beam quality.

However, in order to make the laser beam incident on the optical fiber with a reduced diameter, it is necessary to make the numerical aperture NA (=sin α) of the laser beam closer to a value permissible by the optical fiber 8, as shown in FIG. 10.

In general, the intensity of a laser beam exhibits a Gaussian distribution. In order to transmit a laser beam without causing damage to the optical fiber 8, it is necessary to make the beam incidence diameter $D_2$ sufficiently small, relative to the core diameter of the optical fiber 8.

However, the intensity of a laser beam exhibits a Gaussian distribution and it is necessary to make the numerical aperture NA (=sin α) of the laser beam closer to a value permissible by the optical fiber 8. Therefore, it is not possible to make the beam incidence diameter $D_2$ sufficiently small, relative to the core diameter of the optical fiber 8.

As mentioned above, the emission beam diameter $D_1$ of the solid-state laser apparatus 1 decreases as the laser output increases. On the contrary, the emission beam divergence angle φ tends to increase. Thus, when the light-incidence optical system shown in FIG. 7 is to be designed, it has to be considered that the laser beam can enter the optical fiber 8 with safety in a region of a low laser output.

However, the beam incidence diameter $D_2$ becomes smaller than the core diameter of optical fiber 8 in a high output region where the emission beam diameter D1 is small. Thus, the beam quality of the laser beam cannot fully be exhibited.

In the light-incidence optical system shown in FIG. 7, the distance between the light emission end of solid-state laser apparatus 1 and the first lens 13 is set at $f_1$, and the distance between the second lens 14 and the light-incidence end portion 9 of the optical fiber 8 is set at $f_2$.

Normally, the core diameter of the optical fiber 8 is small and, e.g. about 1/10 to 1/20 of the emission beam diameter D1 of the laser beam emitted from the solid-state laser apparatus 1. It is thus necessary to reduce the emission beam diameter $D_1$ with a nearly equal focusing magnification.

As expressed by the above equation (1), the focusing magnification is determined by a ratio ($f_2/f_1$) between the focal distance $f_1$ of first lens 13 and the focal distance $f_2$ of second lens 14. In order to decrease the beam emission diameter D1, it is thus necessary to increase the focal distance f1 of first lens 13.

As a result, the distance between the light-emission end portion of the solid-state laser apparatus 1 and the light-incidence end portion 9 of the optical fiber 8 increases, and the size of the whole laser processing apparatus increases.

Moreover, the distance $f_1$ between the light-emission plane F of solid-state laser apparatus 1 and the first lens 13 and the distance $f_2$ between the second lens 14 and the light-incidence plane R of optical fiber 8 are determined. Thus, the degree of freedom in design is limited as regards the variation in the distance between the light-emission plane F of solid-state laser apparatus 1 and the light-incidence plane R of optical fiber 8.

BRIEF SUMMARY OF THE INVENTION

The object of the present invention is to provide a laser beam transmission apparatus capable of keeping the beam quality of a laser beam to a maximum and remarkably increasing the degree of freedom in design.

According to an aspect of the present invention, there is provided a laser beam transmission apparatus comprising: a light-incidence optical system converging and focusing a laser beam emitted from a laser apparatus; and an optical fiber which transmits the laser beam that has been converged and focused by the light-incidence optical system, the light-incidence optical system having at least first and second lenses disposed on the same optical path, wherein a first distance between an output end of the laser apparatus and the first lens or a second distance between the second lens and a light-incidence end of the optical fiber is freely set according to a relational formula based on a focal distance of each of the first and second lenses.

BRIEF DESCRIPTION OF THE SEVERAL VIEWS OF THE DRAWING

FIG. 8 illustrates an emission beam diameter and a beam divergence angle in a case where a laser output is decreased;

FIG. 9 illustrates an emission beam diameter and a beam divergence angle in a case where a laser output is increased; and FIG. 10 illustrates a necessary condition for a numerical aperture when a laser beam is to be made incident on a core with a small diameter.

DETAILED DESCRIPTION OF THE INVENTION

Figure 6:
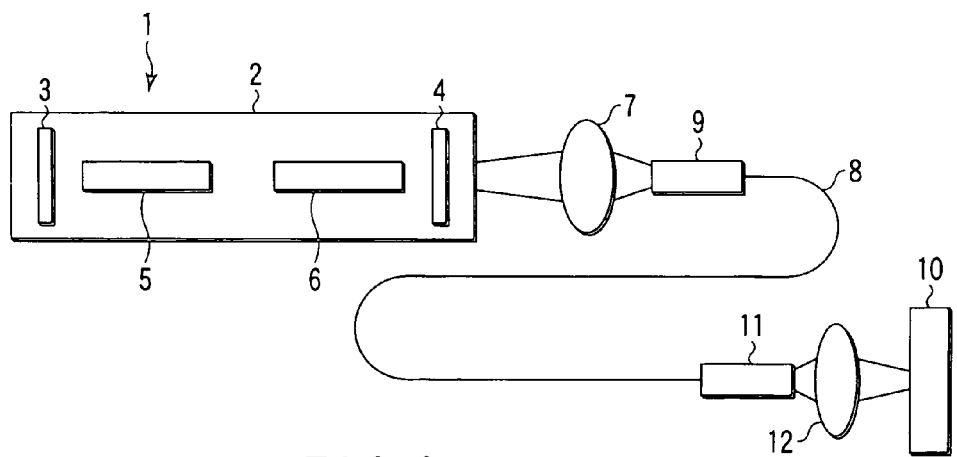
FIG. 6 shows the whole structure of a prior-art laser processing apparatus.
Figure 7:
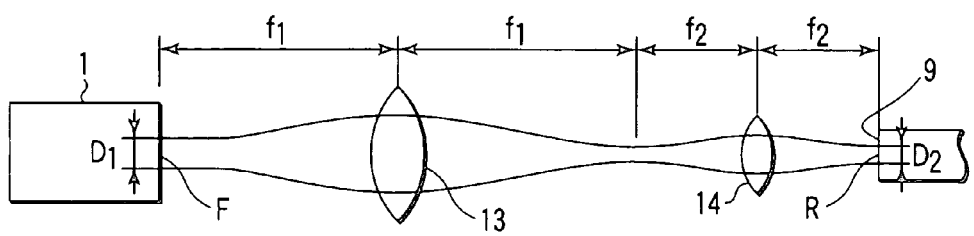
FIG. 7 shows the structure of a prior-art light-incidence optical system.

A first embodiment of the present invention will now be described with reference to the accompanying drawings. The parts common to those in FIGS. 6 and 7 are denoted by like reference numerals, and a detailed description thereof is omitted.

Figure 1:
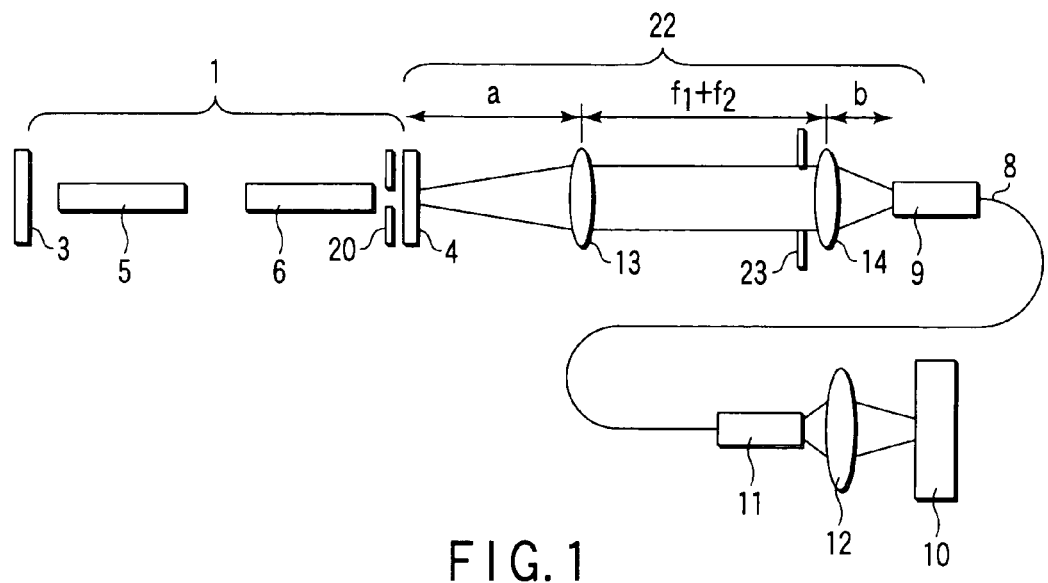
FIG. 1 is a view showing the structure of a laser beam transmission apparatus according to a first embodiment of the present invention.

FIG. 1 is a view showing the whole structure of a laser processing apparatus using a laser beam transmission apparatus according to the present invention. A solid-state laser apparatus 1 includes a first aperture 20 in the vicinity of a light-emission end portion thereof. Specifically, the first aperture 20 is provided, for example, inside the partial-reflection mirror 4 in the laser resonator 2.

The first aperture 20 restricts the beam incidence diameter $D_2$ of a laser beam that is to be input to the optical fiber 8. More specifically, the first aperture 20 controls the beam incidence diameter $D_2$ by controlling the numerical aperture.

The partial-reflection mirror 12 is, for example, a flat mirror. Alternatively, the partial-reflection mirror 12 may be a convex mirror or a concave mirror.

Figure 2:
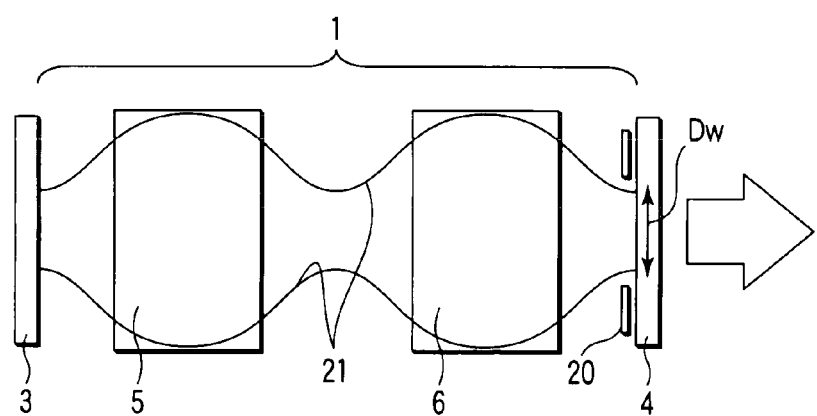
FIG. 2 illustrates a beam mode occurring in a solid-state laser apparatus in the beam transmission apparatus.

FIG. 2 is a diagram illustrating a beam mode 21 to be produced within the laser resonator 2. The beam mode 21 has an axis-symmetric curved shape with respect to the laser beam axis. The shape of the beam mode 21 varies such that it broadens within the laser rods 5 and 6 and narrows in the regions other than the laser rods 5 and 6.

The broadened portion of the beam mode 21 reaches the vicinity of the outer periphery of each laser rod 5, 6. The narrowed portion of beam mode 21 is curved toward the beam axis.

In the case where the partial-reflection mirror 4 is a flat mirror, a beam waist diameter Dw of a minimum-diameter beam mode 21 occurs at the partial-reflection mirror 4. Accordingly, the above-mentioned first aperture 20 is disposed at the position of the beam waist diameter Dw.

In the case where the partial-reflection mirror 4 is a convex mirror, the beam waist diameter Dw occurs on the beam axis on the outside of the laser resonator 2, relative to the position of the partial-reflection mirror 4. Where the partial-reflection mirror 4 is a concave mirror, the beam waist diameter Dw occurs on the beam axis on the inside of the laser resonator 2, relative to the position of the partial-reflection mirror 4.

A light-incidence optical system 22 will now be described.

The light-incidence optical system 22 reduces the emission beam diameter $D_1$ at the output end of solid-state laser apparatus 1 to a beam incidence diameter $D_2$ nearly equal to the core diameter of the light-incidence end portion 9 of the optical fiber 8, thus making the laser beam incident on the light-incidence end portion 9 of optical fiber 8.

The light-incidence optical system 22 includes first and second lenses 13 and 14 provided on the laser beam axis.

The first lens 13 is provided on the laser beam axis at a first distance a from the output end of the solid-state laser apparatus 1. The distance between the first lens 13 and second lens 14 is $f_1 + f_2$, which is the sum of the focal distances $f_1$ and $f_2$ of the first and second lenses 13 and 14.

The distance between the second lens 14 and the light-incidence end portion 9 of optical fiber 8 is set at a second distance b.

Figure 3:
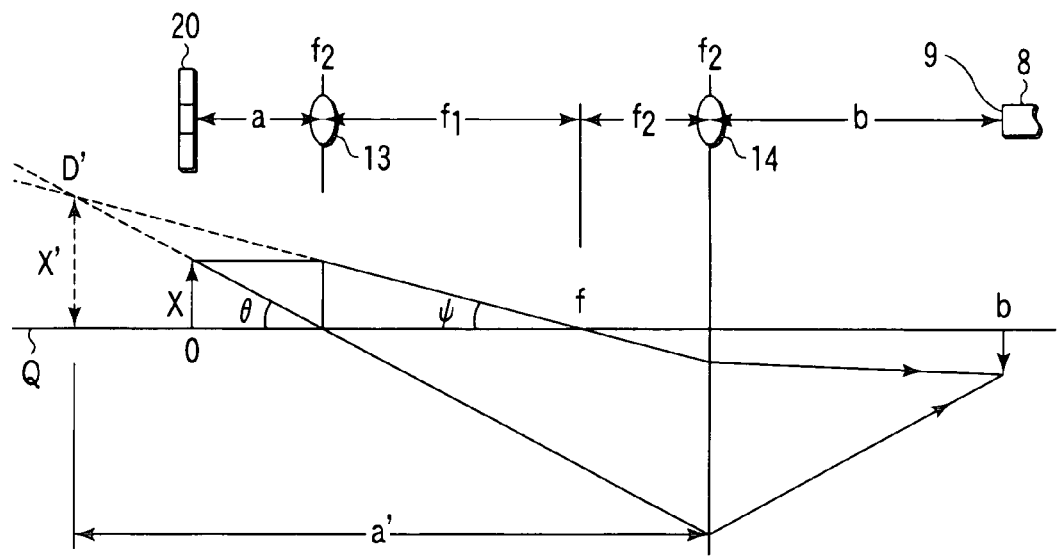
FIG. 3 is a diagram of an optical path of a light-incidence optical system in the apparatus.

The first distance a and second distance b can be freely determined, as described below. FIG. 3 shows the arrangement of the first aperture 20 and first and second lenses 13 and 14 in the light-incidence optical system 22, and also shows an optical path diagram expressed by optical auxiliary lines.

An image plane of a beam waist X appears at the first aperture 20. For the purpose of simplicity, a description is given of a laser beam $L_1$, which emanates from an end Xa of the image plane of the beam waist X in parallel to a laser beam axis Q, and a laser beam $L_2$ passing through the center of the first lens 13.

The laser beam $L_1$ is converged by the first lens 13 and crosses the laser beam axis Q at the position of the focal distance $f_1$. The angle of cross between the laser beam $L_1$ and laser beam axis Q is φ. The laser beam $L_1$ travels and enters the second lens 14. The laser beam $L_1$ is converged by the second lens 14, travels in parallel to the laser beam axis Q and enters the light-incidence end portion 9 of optical fiber 8.

The laser beam $L_2$ is made incident on the center of the first lens 13. The laser beam $L_2$ passes through the center of first lens 13 and enters the second lens 14. The laser beam $L_2$ is converged by the second lens 14 and enters the light-incidence end portion 9 of optical fiber 8. When the laser beam $L_2$ passes through the center of the first lens 13, it crosses the laser beam axis Q at an angle θ.

The laser beam $L_1$ and laser beam $L_2$ fall on the same point at the light-incidence end portion 9.

The relationship between the first distance a, second distance b, focal distance $f_1$ and focal distance $f_2$ will now be defined with reference to FIG. 3.

According to the optical path diagram of FIG. 3, $$X' = (a' - f_1 - f_2)\tan\theta = (a' - f_2)\tan\phi \tag{2}$$

$$\tan\theta = X/a, \text{ and } \tan\theta = X/f_1 \tag{3}$$

Thus $a' = (f_1^2 - f_1 \cdot f_2 - a \cdot f_2)/(f_1 - a)$ \tag{4}

In addition, $1/a' + 1/b = 1/f_2$ \tag{5} and hence the relationship between a and b is given by $$b \approx (f_1^2 \cdot f_2 + f_1 \cdot f_2^2 - a \cdot f_2^2)/f_1^2 \tag{6}$$

In this case, the following conditions are satisfied: $f_1 \neq f_2$, $a \neq f_1$, and $(a+b) < (f_1+f_2)$.

Where the beam emission diameter at the light-emission plane F of solid-state laser apparatus 1 is $D_1$ and the beam incidence diameter at the light-incidence plane R of optical fiber 8 is $D_2$, the light-incidence optical system 22 reduces the beam emission diameter D1 according to the following equation:

$$D_2 = (f_2/f_1)D_1 \tag{7}$$

A second aperture 23 is provided near the second lens 14. Specifically, the second aperture 23 is provided on the laser beam axis on the first lens (13) side of the second lens 14.

The second aperture 23 restricts the numerical aperture of the laser beam to be made incident on the optical fiber 8. Accordingly, the second aperture 23 controls the numerical aperture such that the numerical aperture NA (=sin θ) of the laser beam shown in FIG. 10 may take a value closer to a numerical aperture permissible by the optical fiber 8.

The second aperture 23, together with the first aperture 20 of solid-state laser apparatus 1, controls the laser beam diameter. Thereby, the second aperture 23 prevents the laser beam from falling on that part of the light-incidence end portion 9 of optical fiber 8, which is other than the core portion. As a result, damage to the light-incidence end portion 9 of optical fiber 8 can be prevented.

A processing lens 12 constituting a processing head is disposed on the beam axis in front of the light-incidence end portion 9 of optical fiber 8.

With the above structure, the first distance a and second distance b can be freely determined based on the following formula expressing the relationship between the first distance a (between the output end of solid-state laser apparatus 1 and first lens 13), the second distance b (between the second lens 14 and incident end 9 of optical fiber 8), the focal distance $f_1$ of first lens 13, and focal distance $f_2$ of second lens 14:

$$b \approx (f_1^2 \cdot f_2 + f_1 \cdot f_2^2 - a \cdot f_2^2)/f_1^2 \tag{8}$$

Thus, the length of the light-incidence optical system 22 can be reduced.

The length of the light-incidence optical system 22 of the present invention and the length of the prior-art light-incidence optical system shown in FIG. 7 will now be compared.

Assume that the focal distance $f_1$ of first lens 13 is, e.g. 1000 mm and the focal distance $f_2$ of second lens 14 is, e.g. 50 mm.

From equation (7), the magnification of reduction from the beam emission diameter $D_1$ to beam incidence diameter $D_2$ is given by $$(f_2/f_1) = 50/1000 = 1/20.$$

The length of the prior-art light-incidence optical system shown in FIG. 7 is given by $$f_1 + (f_1 + f_2) + f_2 = 1000 + (1000 + 50) + 50 \quad (9)$$
$$= 2100 \text{ mm}$$

On the other hand, as regards the light-incidence optical system 22 of the present invention, if the first distance a is, e.g. 500 mm, the second distance b is given, based above formula (8), as follows:

$$b = (f_1^2 \cdot f_2 + f_1 \cdot f_2^2 - a \cdot f_2^2)/f_1^2 \quad (10)$$
$$= (1000^2 \cdot 50 + 1000 \cdot 50^2 - 500 \cdot 50^2)/1000^2$$
$$\approx 54 \text{ mm}$$

Accordingly, the length of the light-incidence optical system 22 is expressed by $$a + (f_1 + f_2) + b = 500 + (1000 + 50) + 54 \quad (11)$$
$$= 1604 \text{ mm}$$

As a result, the length of the light-incidence optical system 22 of the present invention can be made less than that of the prior-art light-incidence optical system 22, although they have the same magnification of reduction, i.e. 1/20.

The first distance a is set at, e.g. 500 mm, but this value is not limited to this. The magnification of reduction can be freely set by varying at least one of the focal distances $f_1$ and $f_2$ of first and second lenses 13 and 14.

Therefore, the length of the light-incidence optical system 22 can be freely set, with a freely chosen magnification of reduction.

It was confirmed by experiments that the same operation was achieved with the second distance b that is within values obtained by multiplying the right side of formula (6) by 0.9 to 1.1.

Accordingly, the second distance b may be set at $$\{(f_1^2 \cdot f_2 + f_1 \cdot f_2^2 - a \cdot f_2^2)/f_1^2\} \times 0.9 < b < \{(f_1^2 \cdot f_2 + f_1 \cdot f_2^2 - a \cdot f_2^2)/f_1^2\} \times 1.1 \quad (12)$$

In this case, the following conditions are satisfied: $f_1 \neq f_2$, $a \neq f_1$, $b \neq f_2$, and $(a+b) < (f_1+f_2)$.

As is understood from the above description, the first distance a, second distance b and focal distances $f_1$ and $f_2$ of first and second lenses 13 and 14 can be freely set. The beam emission diameter $D_1$ can be reduced by focusing to the beam incidence diameter $D_2$ according to $D_2 = (f_2/f_1)D_1$.

The processing work by means of the laser processing apparatus with the above structure will now be described.

A laser beam emitted from the solid-state laser apparatus 1 passes through the first lens 13 and second lens 14 and enters the light-incidence end portion 9 of optical fiber 8.

In this case, the laser beam enters the light-incidence end portion 9 of optical fiber 8 with the beam incidence diameter $D_2$, to which the beam emission diameter $D_1$ of the beam from the solid-state laser apparatus 1 has been reduced by the light-incidence optical system 22 (magnification of reduction = $f_2/f_1$)

The optical fiber 8 guides the laser beam input from the incidence end portion 9 and emits it from the emission end portion 11. The laser beam emitted from the emission end portion 11 is converged by the head lens 12 and applied to the workpiece 10. The workpiece 10, for example, is welded or cut by the application of the laser beam.

The laser processing apparatus increases or decreases the laser output, for example, when the workpiece 10 is welded. In general, with the rod-type solid-state laser apparatus 1, the divergence angle $\phi$ of the beam increases and the emission beam diameter $D_1$ decreases as the laser output is increased. On the other hand, with the solid-state laser apparatus 1, the divergence angle $\phi$ of the beam decreases and the emission beam diameter $D_1$ increases as the laser output is decreased.

In the light-incidence optical system 22, since the beam emission diameter $D_1$ is reduced by focusing, the laser beam can be made incident on the light-incidence end portion 9 of optical fiber 8 even if the beam divergence angle $\phi$ and emission beam diameter $D_1$ have varied. Accordingly, the core diameter of the optical fiber 8 can be reduced.

In addition, the first aperture 20 restricts the beam incidence diameter $D_2$ to be made incident on the optical fiber 8.

The second aperture 23 makes the numerical aperture NA $(= \sin \theta)$ of the laser beam shown in FIG. 10 closer to a numerical aperture permissible by the optical fiber 8. Thereby, the second aperture 23 satisfies the condition for making the laser beam incident on the optical fiber 8 with a small core diameter.

Therefore, the laser beam enters the optical fiber 8 with the beam quality maintained. Moreover, since the laser beam does not fall on that part of the light-incidence end portion 9 of optical fiber 8, which is other than the core portion, no damage is caused to the light-incidence end portion 9 of optical fiber 8.

As has been described above, according to the first embodiment, the light-incidence optical system 22 can be reduced since the first distance a between the output end of solid-state laser apparatus 1 and first lens 13 and the second distance b between the second lens 14 and incident end 9 of optical fiber 8 are freely set on the basis of the formula:

$$b \approx (f_1^2 \cdot f_2 + f_1 \cdot f_2^2 - a \cdot f_2^2)/f_1^2 \quad (13)$$

which is based on the focal distance $f_1$ of first lens 13 and focal distance $f_2$ of second lens 14 and satisfies the conditions: $f_1 \neq f_2$, $a \neq f_1$, and $(a+b) < (f_1+f_2)$.

In designing the light-incidence optical system 22, if the first distance a between the output end of solid-state laser apparatus 1 and first lens 13 is freely chosen, then the second distance b between the second lens 14 and incident end 9 of optical fiber 8 can be set. Thereby, the length of the light-incidence optical system 22 can freely be set.

In this case, even if the magnification of reduction by the light-incidence optical system 22 is not varied, the length of the light-incidence optical system 22 can be made less than that of the prior-art light-incidence optical system.

The magnification of reduction can be freely varied by varying at least one of the focal distances $f_1$ and $f_2$ of first and second lenses 13 and 14.

Even where the magnification of reduction has been varied, the length of the light-incidence optical system 22 can freely be altered.

As a result, the distance between the emission end of the solid-state laser apparatus 1 and the incidence end 9 of optical fiber 8 can be reduced, and the entirety of the laser processing apparatus can be reduced in size.

Since the magnification of reduction by the light-incidence optical system 22 can be freely altered and the first distance a between the emission end of solid-state laser apparatus 1 and the first lens 13 can be freely set, the degree of freedom in design of the light-incidence optical system 22 can be greatly enhanced.

Even if the beam divergence angle φ and the beam divergence angle φ are varied in accordance with an increase/decrease in the laser output of solid-state laser apparatus 1, the light-incidence optical system 22 reduces the beam emission diameter $D_1$ by focusing. Thus, the laser beam can be made incident on the incidence end 9 of optical fiber 8. Thereby, the core diameter of optical fiber 8 can be reduced.

Moreover, the first aperture 20 restricts the beam incidence diameter $D_2$ to be made incident on the optical fiber 8 and the second aperture 23 makes the numerical aperture NA (=sin θ) of the laser beam closer to a numerical aperture permissible by the optical fiber 8. Thus, the laser beam can be made incident on the optical fiber 8 with the beam quality maintained.

Since the laser beam does not fall on that part of the light-incidence end portion 9 of optical fiber 8, which is other than the core portion, no damage is caused to the light-incidence end portion 9 of optical fiber 8.

Therefore, the light-incidence optical system 22 can exhibit as much as possible the beam quality of the laser beam emitted from the solid-state laser apparatus 10. Accordingly, compared to the prior-art apparatus, the laser processing apparatus using the light-incidence optical system 22 can perform high-precision processing, such as welding, marking, cutting and scribing.

A second embodiment of the present invention will now be described. The parts common to those shown in FIG. 1 are denoted by like reference numerals, and a detailed description thereof is omitted.

Figure 4:
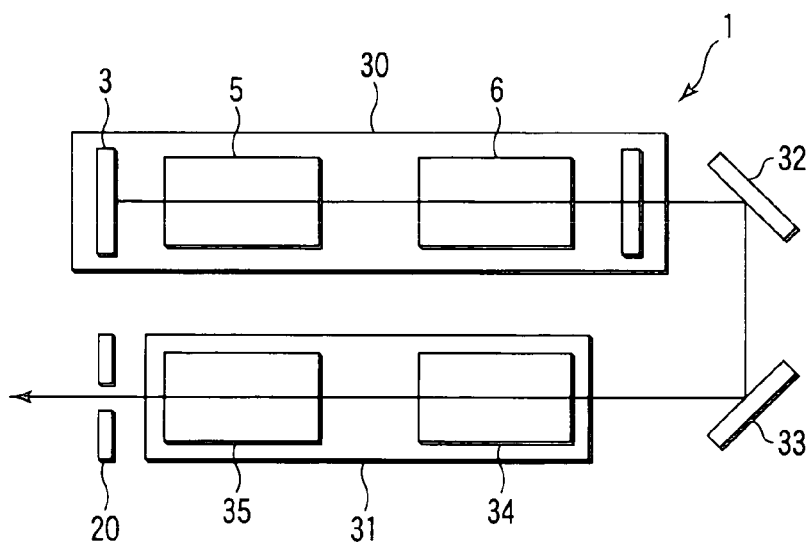
FIG. 4 is a view showing the structure of a solid-state laser apparatus according to a second embodiment of the present invention.

FIG. 4 shows the structure of a solid-state laser apparatus 1. The solid-state laser apparatus 1 comprises a laser oscillator 30, an amplifier 31, and deflection mirrors 32 and 33 disposed between the laser oscillator 30 and amplifier 31.

The laser oscillator 30 has the same structure as the solid-state laser apparatus 1 as described above. The laser oscillator 30 comprises a total-reflection mirror 3 and a partial-reflection mirror 4, which are disposed opposed to each other. Two laser rods 5 and 6, for instance, are provided between the total-reflection mirror 3 and partial-reflection mirror 4.

The deflection mirror 32 is provided on an optical path of a laser beam emitted from the laser oscillator 30. The deflection mirror 32 reflects the laser beam from the laser oscillator 30, for example, at 90°.

The deflection mirror 33 is provided on an optical path of the laser beam reflected by the deflection mirror 32. The deflection mirror 33 reflects the laser beam, which has already been reflected by the deflection mirror 32, for example, at 90°.

The amplifier 31 is provided on an optical path of the laser beam reflected by the deflection mirror 33. The amplifier 31 comprises, for example, two laser rods 34 and 35 arranged in series. The two laser rods 34 and 35 are excited by an excitation section (not shown).

A first aperture 20 is provided on an optical path of the laser beam emitted from the amplifier 31.

In this solid-state laser apparatus 1, the laser beam emitted from the laser oscillator 30 is reflected by the two deflection mirrors 32 and 33 and then input to the amplifier 31.

The amplifier 31 amplifies and emits the input laser beam.

Like the first embodiment, the laser beam emitted from the amplifier 31 passes through the first lens 13 and second lens 14 and enters the light-incidence end portion 9 of optical fiber 8.

As has been described above, according to the second embodiment, the solid-state laser apparatus 1 comprises the amplifier 31. Therefore, a laser beam with a large laser output can be transmitted through the incidence-light optical system 22 and made incident on the optical fiber 8.

Like the first embodiment, even if the beam divergence angle φ and the beam divergence angle φ are varied in accordance with an increase/decrease in the laser output of amplifier 31, the light-incidence optical system 22 reduces the beam emission diameter $D_1$ by focusing. Thus, the laser beam can be made incident on the incidence end portion 9 of optical fiber 8.

The two deflection mirrors 32 and 33, which are provided between the laser oscillator 30 and amplifier 31, deflect the laser beam in a direction opposite to the direction in which the beam has been emitted from the laser oscillator 30. Thus, the length of the solid-state laser apparatus 1 is not increased, and the laser processing apparatus can be reduced in size.

A third embodiment of the present invention will now be described. The parts common to those shown in FIG. 1 are denoted by like reference numerals, and a detailed description thereof is omitted.

Figure 5:
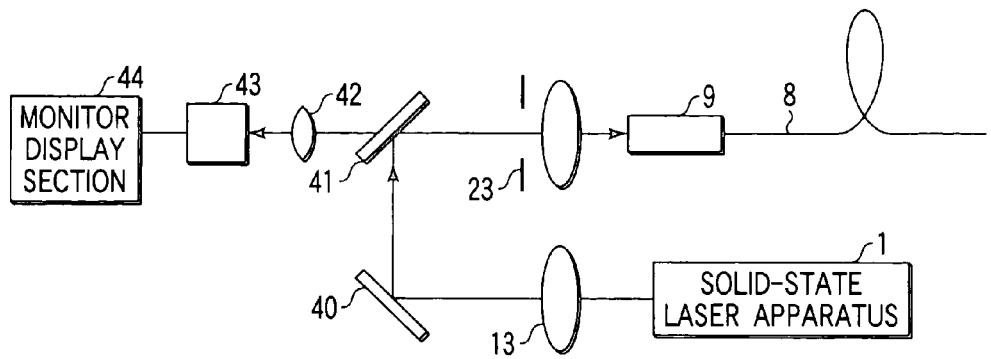
FIG. 5 shows the structure of a light-incidence optical system in the second embodiment of the invention.

FIG. 5 shows the structure of a light-incidence optical system 22. Two deflection mirrors 40 and 41 are provided between a laser oscillator 30 and an amplifier 31. The deflection mirror 40 is provided on an optical path of a laser beam converged by the first lens 13. The deflection mirror 40 reflects the laser beam converted by the first lens 13, for example, at 90°.

The deflection mirror 41 is provided on an optical path of the laser beam reflected by the deflection mirror 40. The deflection mirror 41 reflects the laser beam reflected by the deflection mirror 40, for example, at 90°. The deflection mirror 41 is, for example, a half mirror.

The deflection mirror 41 is not limited to a half mirror. The deflection mirror 41 may be a member that can reflect the laser beam reflected by the deflection mirror 40 at 90° and can transmit the beam from the second lens 14.

An optical fiber end monitor camera 43 is provided via a monitor lens 42 on an optical path connecting the incidence end portion 9 of optical fiber 8, the second lens 14 and the deflection mirror 41.

The monitor lens 42 and second lens 14 constitute a focusing optical system for observing an end face of the light-incidence end portion 9 of optical fiber 8.

The optical fiber end monitor camera 43 takes a surface image of the incidence end portion 9 of optical fiber 8 via the monitor lens 42, deflection 41 and second lens 14. The optical fiber end monitor camera 43 produces an image signal of the surface image of the incidence end portion 9 of optical fiber 8.

The optical fiber end monitor camera 43 comprises, for example, a CCD camera.

A monitor display section 44 receives the image signal from the optical fiber end monitor camera 43, and monitor-displays the surface image of the incidence end portion 9 of optical fiber 8.

With the above structure, the optical fiber end monitor camera 43 takes a surface image of the incidence end portion 9 of optical fiber 8 via the monitor lens 42, deflection 41 and second lens 14.

The monitor display section 44 receives the image signal from the optical fiber end monitor camera 43, and monitor-displays the surface image of the incidence end portion 9 of optical fiber 8.

Thus, the monitor display section 44 displays the condition of the incidence end portion 9 of optical fiber 8.

The monitor display section 44 displays, for example, the condition of incidence of the laser beam on the core layer at the incidence end portion 9 of optical fiber 8. For example, when the beam divergence angle φ and the beam divergence angle φ are varied in accordance with an increase/decrease in the laser output of solid-state laser apparatus 1, the monitor display section 44 can display the condition of incidence of the laser beam on the core layer.

By virtue of the monitor display, the worker can confirm whether the laser beam is incident on the optical fiber 8 with the beam quality maintained.

The present invention is not limited to the first to third embodiments, and the invention may be modified as follows.

In the first to third embodiments, the invention is applied to the laser processing apparatus. Alternatively, the invention may be applied to any apparatus which requires a technique for transmitting a laser beam emitted from a laser and making it incident on an optical fiber. For example, this invention is applicable to an optical communication apparatus that transmits a laser beam with information over an optical fiber.

In the first to third embodiments, the solid-state laser apparatus 1 is used. Alternatively, a gas laser or a liquid laser may be used.

The solid-state laser apparatus 1 shown in FIG. 4 comprises a single amplifier 31. Alternatively, it may comprise two or more amplifiers 31. In this case, an increase in length of the solid-state laser apparatus 1 can be prevented by providing deflection mirrors between the respective amplifiers 31.

Each of the first lens 13 and second lens 14 of the light-incidence optical system 22 may comprise a lens group of a plurality of lenses combined.

It should suffice if at least one of the first aperture 20 and second aperture 23 may be provided. If only the first aperture 20 is provided, the beam incidence diameter D2 alone of the laser beam incident on the optical fiber 8 is restricted. If only the second aperture 23 is provided, the numerical aperture NA of the laser beam incident on the optical fiber 8 is restricted.

What is claimed is:

1. A laser beam transmission apparatus comprising:
   a light-incidence optical system having at least first and second lenses disposed on the same optical path, the light-incidence optical system converging and focusing a laser beam emitted from a laser apparatus; and
   an optical fiber which transmits the laser beam that has been converged and focused by the light-incidence optical system,
   wherein in the light-incidence optical system, a first distance between an output end of the laser apparatus and the first lens or a second distance between the second lens and a light-incidence end of the optical fiber is freely set according to a relational formula based on a focal distance of each of the first and second lenses, and
   wherein said relational formula is expressed by $$b \approx (f_1^2 \cdot f_2 + f_1 \cdot f_2^2 - a \cdot f_2^2)/f_1^2$$

where a is the first distance, b is the second distance, $f_1$ is the focal distance of the first lens, and $f_2$ is the second lens, and
   the following conditions are satisfied:

$$f_1 \neq f_2, a \neq f_1, \text{ and } (a+b) < (f_1+f_2).$$

2. A laser beam transmission apparatus according to claim 1, wherein the light-incidence optical system reduces an emission beam diameter of the laser beam at the output end of the laser apparatus to a diameter of the light-incidence end of the optical fiber, thus making the laser beam incident on the light-incidence end of the optical fiber.

3. A laser beam transmission apparatus according to claim 1, wherein said second distance b is given by $$\{(f_1^2 \cdot f_2 + f_1 \cdot f_2^2 - a \cdot f_2^2)/f_1^2\} \times 0.9 < b < \{(f_1^2 \cdot f_2 + f_1 \cdot f_2^2 - a \cdot f_2^2)/f_1^2\} \times 1.1.$$

4. A laser beam transmission apparatus according to claim 1, wherein an emission beam diameter of the laser beam is $D_1$ and an incidence beam diameter of the laser beam made incident on the light-incidence end of the optical fiber is $D_2$, a magnification ratio for reducing the emission beam diameter $D_1$ to the incidence beam diameter $D_2$ is given by $$D_2 = (f_2/f_1)D_1.$$

5. A laser beam transmission apparatus according to claim 1, wherein said laser apparatus is a solid-state laser apparatus capable of controlling an output level of the laser beam.

6. A laser beam transmission apparatus comprising:
   a light-incidence optical system having at least first and second lenses disposed on the same optical path, the light-incidence optical system converging and focusing a laser beam emitted from a laser apparatus;
   an optical fiber which transmits the laser beam that has been converged and focused by the light-incidence optical system; and
   an aperture disposed in an output end of the laser apparatus and located at a position of a beam waist with a minimum beam diameter in a beam mode of laser resonance occurring in the laser apparatus, the aperture restricting a beam diameter of the laser beam to be made incident on the optical fiber,
   wherein in the light-incidence optical system, a first distance between the output end of the laser apparatus and the first lens or a second distance between the second lens and a light-incidence end of the optical fiber is freely set according to a relational formula based on a focal distance of each of the first and second lenses.

7. A laser beam transmission apparatus according to claim 6, further comprising:
   another aperture disposed in a vicinity of the second lens which restricts a numerical aperture of the laser beam to be made incident on the optical fiber.

8. A laser beam transmission apparatus according to claim 1, wherein the laser apparatus comprises:
   a laser oscillator which oscillates and outputs the laser beam;

an amplifier which amplifies the laser beam oscillated and output from the laser oscillator; and an aperture which is disposed on an optical path of the laser beam amplified and output from the amplifier and restricts a beam diameter of the laser beam to be made incident on the optical fiber.

9. A laser beam transmission apparatus according to claim 1, further comprising:

at least one beam splitter disposed on an optical path between said first lens and said second lens;

an imaging section which images a light-incidence end face of the optical fiber via the beam splitter and the second lens; and a monitor display section which monitor-displays the light-incidence end face of the optical fiber, which has been imaged by the imaging section.

10. A laser beam transmission apparatus according to claim 1, further comprising:

two deflection mirrors which are disposed on an optical path between the first lens and the second lens and deflect a direction of travel of the laser beam;

a monitor lens disposed on a straight optical path connecting a light-incidence end face of the optical fiber, the second lens, and one of the two deflection mirrors;

an imaging section which images the light-incidence end face of the optical fiber via the monitor lens, said one of the two deflection mirrors, and the second lens; and a monitor display section which monitor-displays the condition of the light-incidence end face of the optical fiber, which has been imaged by the imaging section.

11. A laser beam transmission apparatus comprising:

a light-incidence optical system which converges and focuses a laser beam emitted from a laser apparatus;

an optical fiber which transmits the laser beam that has been converged and focused by the light-incidence optical system;

a first aperture which is located at a position of a beam waist with a minimum beam diameter in a beam mode of laser resonance occurring in the laser apparatus and restricts the beam diameter of the laser beam to be made incident on the optical fiber;

a second aperture which is disposed in the vicinity of the second lens and restricts a numerical aperture of the laser beam to be made incident on the optical fiber;

a reflection mirror which reflects the laser beam that has passed through the first lens;

a reflective transmission mirror that reflects the laser beam, which has been reflected by the reflection mirror, and makes the laser beam incident on the second lens, and also passes an image of the light-incidence end face of the optical fiber, which has been made incident via the second lens;

a monitor lens disposed on a straight optical path connecting the light-incidence end face of the optical fiber, the second lens, and the reflective transmission mirror;

an imaging section which images the light-incidence end face of the optical fiber via the monitor lens, the reflective transmission mirror, and the second lens; and a monitor display section which monitor-displays the condition of the light-incidence end face of the optical fiber, which has been imaged by the imaging section, wherein the light-incidence optical system comprises first and second lenses that reduce an emission beam diameter of the laser beam at the output end of the laser apparatus to a diameter of the light-incidence end of the optical fiber, thus making the laser beam incident on the light-incidence end of the optical fiber, and when the following relation is established, $$b \approx (f_1^2 \cdot f_2 + f_1 \cdot f_2^2 - a \cdot f_2^2)/f_1^2$$

where a is the first distance, b is the second distance, $f_1$ is the focal distance of the first lens, and $f_2$ is the second lens, and the following conditions are satisfied:

$$f_1 \neq f_2, a \neq f_1, \text{ and } (a+b) < (f_1+f_2).$$

* * * * *